United States Patent
Cao et al.

(10) Patent No.: US 12,176,720 B2
(45) Date of Patent: Dec. 24, 2024

(54) SELF-GENERATING POWER SUPPLY APPARATUS

(71) Applicants: Jue Wang, Beijing (CN); Guangzhou Institute of Blue Energy, Guangzhou (CN); YANGTZE RIVER DELTA (JIAXING) NANO APPLIED TECHNOLOGY RESEARCH INSTITUTE, Jiaxing (CN)

(72) Inventors: Xia Cao, Beijing (CN); Jue Wang, Beijing (CN)

(73) Assignees: Jue Wang, Beijing (CN); Guangzhou Institute of Blue Energy, Guangzhou (CN); YANGTZE RIVER DELTA (JIAXING) NANO APPLIED TECHNOLOGY RESEARCH INSTITUTE, Jiaxing (CN)

( * ) Notice: Subject to any disclaimer, the term of this patent is extended or adjusted under 35 U.S.C. 154(b) by 38 days.

(21) Appl. No.: 17/782,672

(22) PCT Filed: Feb. 3, 2020

(86) PCT No.: PCT/CN2020/074233
§ 371 (c)(1),
(2) Date: Jun. 6, 2022

(87) PCT Pub. No.: WO2021/109335
PCT Pub. Date: Jun. 10, 2021

(65) Prior Publication Data
US 2023/0010523 A1    Jan. 12, 2023

(30) Foreign Application Priority Data
Dec. 6, 2019 (CN) .......................... 201922172388.4

(51) Int. Cl.
*H02J 50/00* (2016.01)
*H02N 1/04* (2006.01)
(Continued)

(52) U.S. Cl.
CPC ............. *H02J 50/001* (2020.01); *H02N 1/04* (2013.01); *H02N 2/18* (2013.01); *H02N 11/002* (2013.01)

(58) Field of Classification Search
CPC . H02J 50/001; A43B 3/34; A43B 3/38; H02K 35/02; H02N 1/04; H02N 2/18;
(Continued)

(56) References Cited

U.S. PATENT DOCUMENTS 10,622,918 B2 * 4/2020 Turng ...................... H02N 1/04
10,746,339 B2 * 8/2020 Sue ........................ F16L 55/136
(Continued)

FOREIGN PATENT DOCUMENTS

CN    101219257 A    7/2008
CN    103780129 A    5/2014
(Continued)

OTHER PUBLICATIONS

Lee et al., "The TriboElectric Series", AlphaLab Inc., retrieved from https://www.alphalabinc.com/triboelectric-series/ on Apr. 11, 2024 (Year: 2024).*
(Continued)

*Primary Examiner* — Ryan Johnson
(74) *Attorney, Agent, or Firm* — Bayramoglu Law Offices LLC

(57) ABSTRACT

A self-generating power supply apparatus includes a power generating body, an energy harvester, and a power consumer. The power generating body generates an electromagnetic field when a force is applied, an energy of the electromagnetic field is received by the energy harvester and subsequently transferred to the power consumer; or alternatively, the energy harvester is not provided and the energy of the electromagnetic field is directly received and used by the power consumer. The energy of the electromagnetic field is (Continued)

harvested by the energy harvester contacting or not contacting the power generating body, and then is converted into electrical energy, which is transferred out in a wired or wireless manner to enable self-generating power supply for the apparatus. The self-generating power supply apparatus has an immeasurable impact on the development in the fields such as wearable devices, small mobile communication devices, Internet of Things, new energy etc.

9 Claims, 6 Drawing Sheets

(51) Int. Cl.
*H02N 2/18* (2006.01)
*H02N 11/00* (2006.01)
(58) Field of Classification Search
CPC .. H02N 1/06; H02N 1/08; H02N 1/10; H02N 1/12
See application file for complete search history.

(56) References Cited

U.S. PATENT DOCUMENTS

| | | | | |
|---|---|---|---|---|
| 10,804,818 B2 * | 10/2020 | Wu | ............................ | H02N 1/04 |
| 10,873,277 B2 * | 12/2020 | Kim | ........................ | H02N 2/18 |
| 2013/0049531 A1 * | 2/2013 | Wang | ........................ | H02N 1/04 |
| | | | | 310/309 |
| 2017/0271922 A1 * | 9/2017 | Kim | ........................ | A43B 3/38 |
| 2021/0046788 A1 * | 2/2021 | Motamed | ................ | H02J 50/05 |

FOREIGN PATENT DOCUMENTS

| | | |
|---|---|---|
| CN | 105337526 A | 2/2016 |
| CN | 107124118 A | 9/2017 |
| CN | 108092544 A | 5/2018 |
| JP | 2011015503 A | 1/2011 |

OTHER PUBLICATIONS

Xia Cao, New insights into Maxwell's equations based on new experimental discoveries, Composites Communications, 2023, pp. 1-11, vol. 39 No. 101552.

Xia Cao, et al., Power generation by contact and the potential applications in new energy, Nano Energy, 2021, pp. 1-9, vol. 87 No. 106167.

Xia Cao, A power road by harvesting electromagnetic energy from moving object, Nano Energy, 2023, pp. 1-10, vol. 112 No. 108486.

Xia Cao, et al., An easy and efficient power generator with ultrahigh voltage for lighting, charging and self-powered systems, Nano Energy, 2022, pp. 1-8, vol. 100 No. 107409.

* cited by examiner

SELF-GENERATING POWER SUPPLY APPARATUS

CROSS REFERENCE TO THE RELATED APPLICATIONS

This application is the national phase entry of International Application No. PCT/CN2020/074233, filed on Feb. 3, 2020, which is based upon and claims priority to Chinese Patent Application No. 201922172388.4, filed on Dec. 6, 2019, the entire contents of which are incorporated herein by reference.

TECHNICAL FIELD

The present invention relates to the field of new energy technologies, in particular to a self-generating power supply apparatus.

BACKGROUND

With the development of science and technologies and the improvement of people's living standards, the need for wearable devices and small mobile communication devices has increased sharply, and mobile phones, computers and other such devices have become an indispensable part of people's daily life. Currently, the main energy source for such devices is rechargeable batteries that need to be recharged through an external power source. However, it is difficult to acquire or use such external power sources in the wild or under other complicated conditions, which limits the usage of such device. In addition, the existing electrical energy generation, which relies mainly on combustion of fossil fuels, hydroelectric power generation, and the like, has low energy conversion efficiency and causes environmental pollution. Therefore, there is an urgent need for an apparatus that utilizes clean and safe energy and that is capable of recharging these wearable devices and small mobile communication devices in real-time, expanding the scope of application of such devices, and creating a broader information exchange network.

The apparatus according to the present invention can overcome the shortcomings in traditional devices, and can also achieve the purpose that small-sized power consumers are directly recharged in real-time without any external power supply, by directly converting mechanical energy into electrical energy in a wired or wireless manner. The apparatus according to the present invention will not only lead to a significant progress with regard to the technologies for wearable devices and small mobile communication devices, but also have an immeasurable impact on the fields such as Internet of Things, sensing, etc.

SUMMARY

The technical problem to be solved by the present invention is to provide a self-generating power supply apparatus.

The apparatus includes a power generating body, an energy harvester and a power consumer, the power generating body generates an electromagnetic field through an action force, and an energy of the electromagnetic field is harvested by the energy harvester and transferred to the power consumer.

Where the energy of the electromagnetic field may also be directly received and used by the power consumer, the power consumer harvests the energy of the electromagnetic field in a wired or wireless transmission manner by contacting or not contacting the power generating body.

The action force includes contacting, collision, slapping, tapping, stepping, squeezing, rubbing, etc.

The energy of the electromagnetic field that is generated when a force is applied to the power generating body is harvested by the energy harvester contacting or not contacting the power generating body, in a wired or wireless transfer manner, and then is converted into electrical energy for use by the power consumer. Contacting or not contacting refers to the form of reception of the energy of the electromagnetic field between the energy harvester and the power generating body, wired or wireless refers to the transmission of electrical energy between the energy harvester and the power consumer, so there is no direct link therebetween. When the energy harvester receives the energy of the electromagnetic field by contacting the power generating body, electrical energy can be transmitted to the power consumer not only in a wired manner, but also in a wireless manner. In the same way, when the energy harvester receives the energy of the electromagnetic field without contacting the power generating body, electrical energy can be transmitted to the power consumer not only in a wired manner, but also in a wireless manner.

The power generating body is made from not less than one organic material, inorganic material or composite material, and the power generating body is of a one-dimensional, two-dimensional or three-dimensional structure. The power generating body is of a rigid or flexible structure.

The energy harvester is made from not less than one organic material, inorganic material or composite material, and the energy harvester is an article made from artificial materials or a naturally occurring object. The energy harvester is of a rigid or flexible structure.

The power generating body, the energy harvester and the power consumer in the apparatus are incorporated in ways that include: a simple stacking structure, a meshing structure, a merging integral structure, an inlaid structure, an island-like distribution structure, an array structure, a random dispersion structure, etc.

The environments in which the apparatus is applied include: complex environments such as a liquid environment, a gaseous environment, a high-temperature environment, etc.

The above-mentioned technical solution of the present invention has the following advantageous effects.

The apparatus according to the present invention can overcome the shortcomings in traditional devices, and can also achieve the purpose that small-sized power consumers are directly recharged in real-time without any external power supply, by directly converting mechanical energy into electrical energy in a wired or wireless manner. The apparatus according to the present invention will not only lead to a significant development of the technologies for wearable devices and small mobile communication devices, but also have an immeasurable impact on the fields such as Internet of Things, sensing, etc. The conversion and efficient utilization of energy and therefore sound social development will be realized.

BRIEF DESCRIPTION OF THE DRAWINGS

FIG. 3A and FIG. 3B show bulb brightness in case of a relatively small action force, FIG. 3C and FIG. 3D show bulb brightness in case of a relatively large action force, and FIG. 3E shows the actual layout of bulbs;

Figure 1:
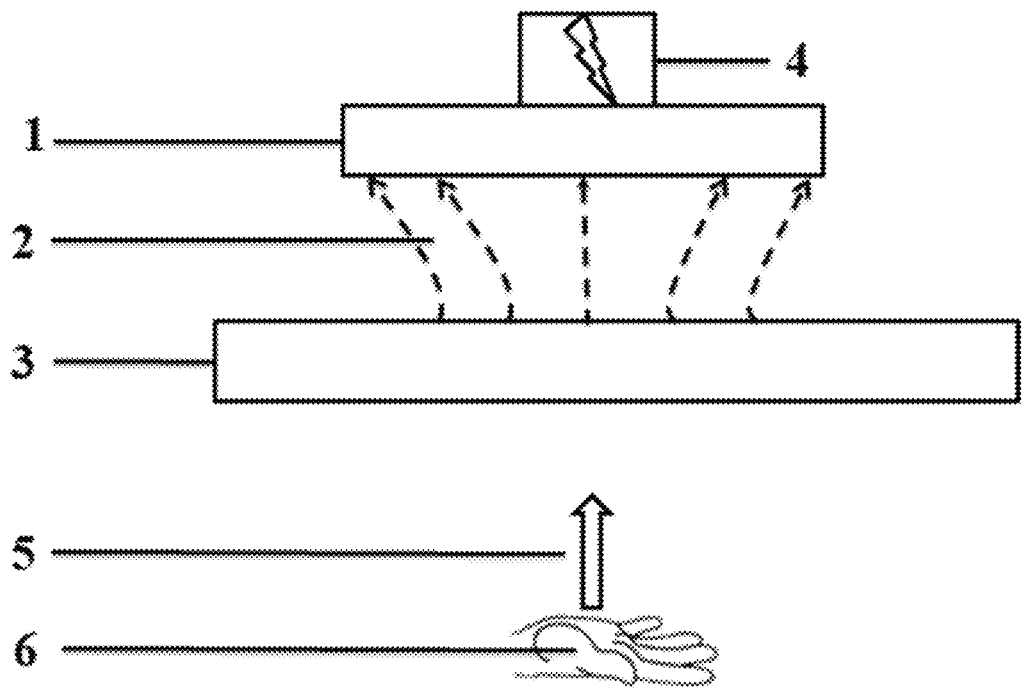
FIG. 1 is a schematic diagram of a self-generating power supply apparatus according to the present invention.

In the drawings:
1 energy harvester;
2 electromagnetic field;
3 power generating body;
4 power consumer;
5 action force;
6 human hand;
7 large LED light;
8 insulating layer-wrapped wire;
9 laptop;
10 thin slab;
11 serially-connected small LED lights;
12 wirelessly rechargeable mobile phone;
13 metal coil;
14 power generating bodies on the backside of a mobile phone shell that are distributed in an island-like form;
15 smart watch;
16 film;
17 power generating bodies inlaid in the energy harvester;
18 energy harvester inlaid with the power generating bodies;
19 tablet;
20 power generating bodies woven with the energy harvester;
21 energy harvester woven with the power generating bodies.

DETAILED DESCRIPTION OF THE EMBODIMENTS

For a better clarity of the technical problem to be solved by the present invention as well as the technical solutions and advantages of the present invention, a detailed description will be given below with reference to the accompanying drawings and specific embodiments.

The present invention provides a self-generating power supply apparatus.

As shown in FIG. 1, the apparatus includes a power generating body 3, an energy harvester 1, and a power consumer 4, the power generating body 1 generates an electromagnetic field 2 through an action force 5, and an energy of the electromagnetic field is harvested by the energy harvester 1 and then transferred to the power consumer 4.

The apparatus may also not include the energy harvester. Energy harvesting and use of the electrical energy are both achieved by the power consumer, in which case the energy harvester can be perceived as a component of the power consumer (not only serving as a functional structure of the power consumer, but also harvesting the energy from the electromagnetic field), namely only two parts, i.e., the power generating body and the power consumer, are included.

The structure of this apparatus is not limited to a simple stacked "sandwich" structure, and may also be a gear-like structure in which the power generating body and the energy harvester are meshed, or an integral structure in which the power generating body and the energy harvester are merged, or a structure in which the power generating body and the energy harvester are inlaid together, or a structure in which two closed curved surfaces are nested, or other structures capable of power generation.

The power generating body to which a force caused by contacting, collision, slapping, tapping, stepping, squeezing, rubbing, etc. is applied can generate the energy of the electromagnetic field. Meanwhile, the energy harvester, or the power consumer used directly as the energy harvester, can harvest the energy of the electromagnetic field by contacting or not contacting the power generating body in a wired or wireless transfer manner, and thus create an electrical energy output to enable self-generating power supply. This will have a significant impact on the development of wearable devices and small mobile communication devices. Furthermore, the apparatus is not only a major breakthrough in energy, but also solves the problems of sustainable power supply and recharging for wearable devices (including mobile phones, electronic watches, etc.).

The power generating body may be constructed from one material or a combination or composite of two or more materials. The power generating body may be made from a flexible material or a rigid material. The power generating body may be a conductor, a semiconductor or an insulator, and may also be made from other materials that are prone to generate an electromagnetic field when a force is applied.

The power generating body may be a two-dimensional flat plate, film or thin slab, may be a three-dimensional solid, and may be a curved surface Any object that can generate the energy of an electromagnetic field can be used as the power generating body, regardless of its shape.

The amount of the electromagnetic field energy generated by the power generating body is related to factors such as the area to which the force is applied, the magnitude of the applied force, the force-applying object, the number of the power generating bodies, etc. The electromagnetic field generated by the power generating body has a particular range and direction. The specific direction and range are related to the direction of the action force, the material of the force-applying object, the material from which the power generating body is constructed, the magnitude of the action force, the location where the action force is applied, etc.

The object that applies the action force may be a living body or a non-living body, and may be constructed from an organic material, an inorganic material or an organic-inorganic composite material.

The size of the power generating body and the energy harvester or the power consumer that can be directly used as the energy harvester may be the same or not. For example, the power generating bodies may be distributed, in the form of an island-like array, on the energy harvester or the power consumer that is directly used as the energy harvester, and may also completely fit the energy harvester or the power consumer that is directly used as the energy harvester, since they all have the same shape and size. This can not only broaden the range of conditions under which this self-generating power supply apparatus is used, but also increase the effective reception area for the energy of the electromagnetic field.

The power generating body and the energy harvester can be used in a wide variety of complex environments, including routine atmospheric environments, different gaseous environments, different liquid environments, and even vacuum environments. This overcomes the "sensitiveness" shortcoming of traditional power supplies. For instance, some power supplies fail in humid environments, and chemical power supplies undergo unfavorable chemical reactions in high-temperature environments.

The power generating body and the energy harvester do not need to be precision-manufactured through use of expensive instruments. This novel self-generating power supply apparatus is characterized by its simple structure, easy manufacturing and low price, and the energy source for this self-generating power supply apparatus is renewable.

The energy harvester may be located above or below the power generating body, and may be located at any position within a range in which the energy of the electromagnetic field can be harvested. The energy harvester can harvest the energy by contacting or not contacting the power generating body, and supply the energy to the power consumer in a wired or wireless manner. In the same way, in a case where the power consumer is directly used as the energy harvester, the power consumer can be located at any position within a range in which the energy of the electromagnetic field can be harvested. The power consumer may contact or not contact the power generating body, and harvest the energy in a wired or wireless manner for own use.

The material from which the energy harvester is constructed may be a conductor, a semiconductor or an insulating layer-wrapped wire, may be one material or two or more materials, may be an organic material, an inorganic material or a composite material, and may be rigid or flexible. Different types of energy harvesters that are made from different materials have different energy harvesting capabilities.

Although the energy harvester is not limited by shape or the like, different shapes may affect the harvesting efficiency. The energy harvesting efficiency of the energy harvester is related to factors such as the material of the harvester, the number of the harvester, the distance between the energy harvester and the power generating body, the effective reception area, etc.

The energy harvester or the power consumer that can be directly used as the energy harvester, and the power generating body may be relatively movable or relatively stationary. A rechargeable mouse can be self-recharged while being moved on a desktop that is made of a special material, and at this moment the desktop functions as the power generating body, the rechargeable mouse is directly used as the energy harvester, and the both are relatively movable; a mobile phone, a shell of which is made from a particular material, can be recharged by rubbing or tapping the shell with a hand, and at this moment the shell of the mobile phone functions as the power generating body, the mobile phone is directly used as the energy harvester, and the both are relatively stationary.

The power consumer may be a power consumer in daily life, such as bulb, electronic watch, mobile phone, etc. The power consumer that can be directly used as the energy harvester refers to a power consumer that has some structures and materials of the energy harvester and is able to directly harvest the energy of the electromagnetic field generated by the power generating body, e.g., LED light, wirelessly rechargeable mobile phone, etc. Any power consumer that can harvest the energy directly and any power consumer that can be connected with the energy harvester to consume the electrical energy can form, together with the power generating body and the energy harvester, this novel self-generating power supply apparatus.

In this apparatus, the power generating body to which a force is applied (including contacting, collision, slapping, tapping, stepping, squeezing, rubbing, etc.) can generate the energy of the electromagnetic field. Meanwhile, the energy harvester, or the power consumer that can be used as the energy harvester, can harvest the energy of the electromagnetic field by contacting or not contacting the power generating body, convert the energy of the electromagnetic field into electrical energy, and transfer the electrical energy to the power consumer in a wired or wireless transfer manner.

As shown in FIG. 1, when a human hand 6 slaps a power generating body 3, the power generating body to which a force is applied (including contacting, collision, slapping, tapping, stepping, squeezing, rubbing, etc.) will generate an electromagnetic field. The energy harvester or the power consumer that can be directly used as the energy harvester harvests the energy of the electromagnetic field in a wired or wireless manner by contacting or not contacting the power generating body, and then converts the energy into electrical energy, so as to enable self-generating power supply.

A description is given below in conjunction with the specific embodiments.

Embodiment 1

Figure 2:
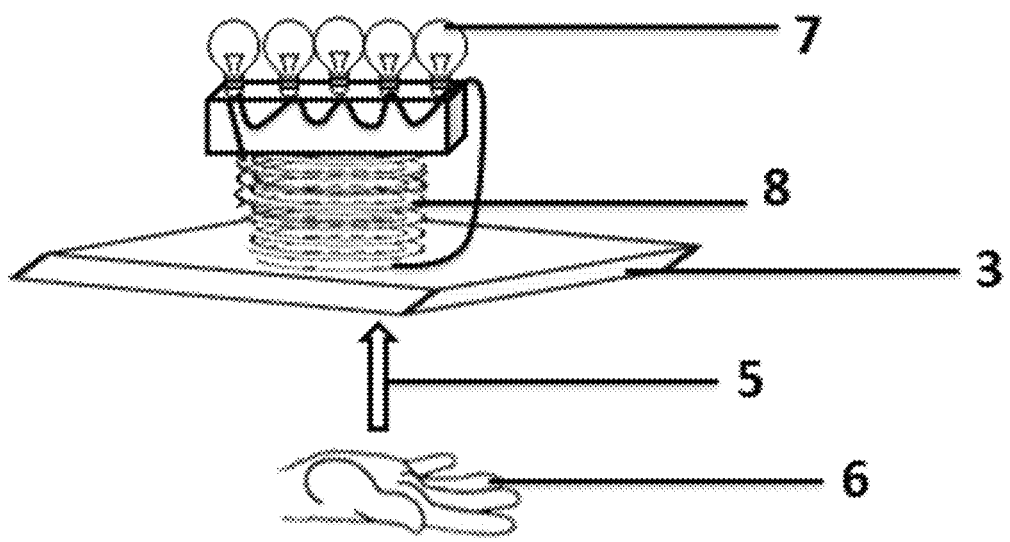
FIG. 2 is a schematic diagram of energy harvesting according to embodiment 1 of the present invention.
Figure 3A:
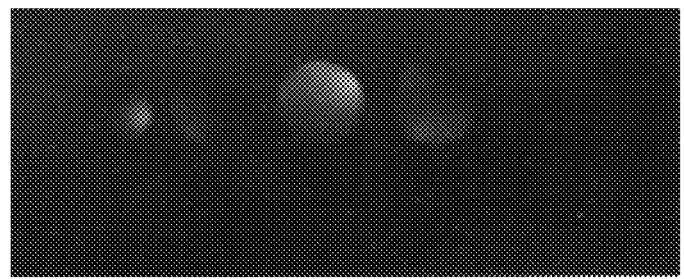
FIGS. 3A-3E show a pictorial diagram of lighting up bulbs according to embodiment 1, where
Figure 3B:
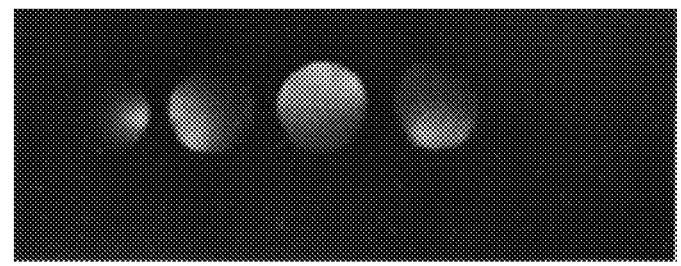
Figure 3C:
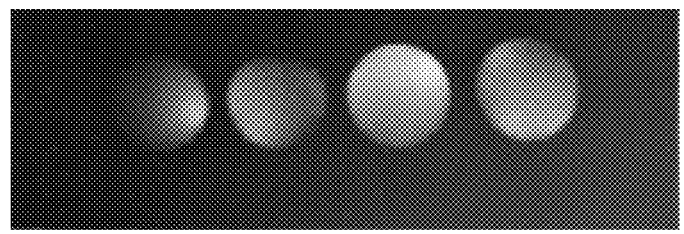
Figure 3D:
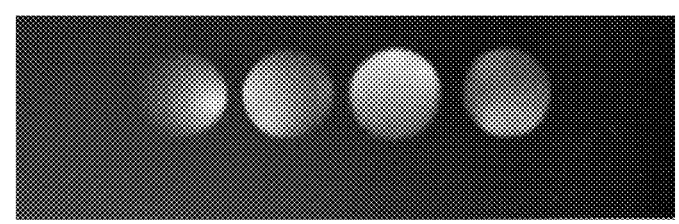
Figure 3E:
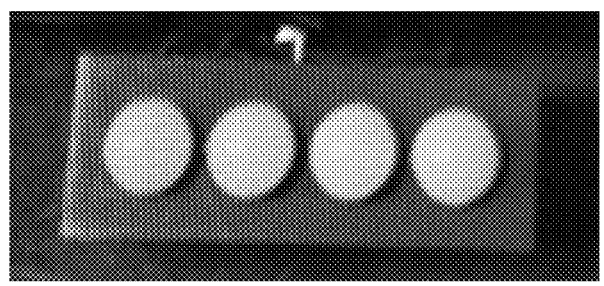

As shown in FIG. 2, a coil produced from an insulating layer-wrapped wire 8 is fixed on the power generating body 3, and is also connected with large LED lights 7 to create a loop. The LED lights can be lit up (see FIGS. 3A-3E) when the human hand 6 applies a force to the power generating body (such as contacting, slapping, rubbing, tapping, etc.). At this moment, the coil is used as the energy harvester and the large LED lights are used as the power consumers.

Embodiment 2

Figure 4:
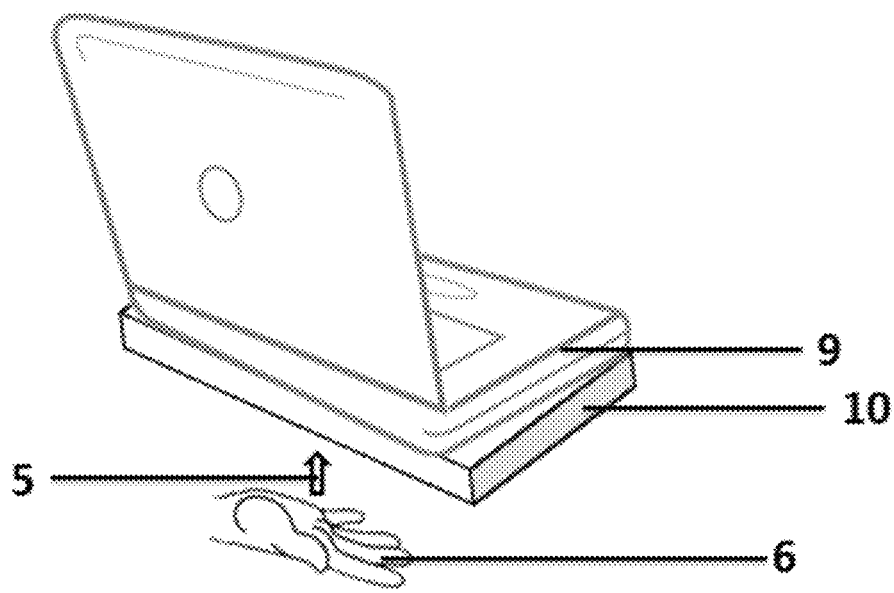
FIG. 4 is a schematic diagram of energy harvesting according to embodiment 2 of the present invention.

As shown in FIG. 4, a thin slab 10 that can generate the energy of the electromagnetic field when a force is applied (such as contacting, collision, slapping, tapping, stepping, squeezing, rubbing, etc.) is fixed at the bottom of a laptop 9, and recharging for the laptop can be accomplished after a person applies a force to the thin slab. At this moment, the thin slab at the bottom of the laptop is used as the power generating body, the laptop is directly used as the energy harvester to harvest the energy of the electromagnetic field for its own use.

Embodiment 3

Figure 5:
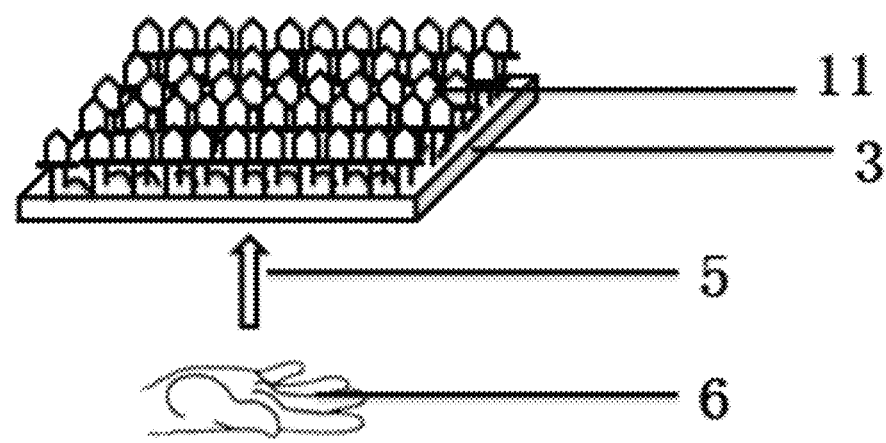
FIG. 5 is a schematic diagram of energy harvesting according to embodiment 3 of the present invention.

As shown in FIG. 5, small LED lights 11 that are connected in series are placed on the power generating body 3 as a whole, and can be lit up when a person applies a force (including contacting, collision, slapping, tapping, stepping, squeezing, rubbing, etc.) to the power generating body. At this moment, the LED lights are used not only as the energy harvesters but also as the power consumers.

Embodiment 4

Figure 6:
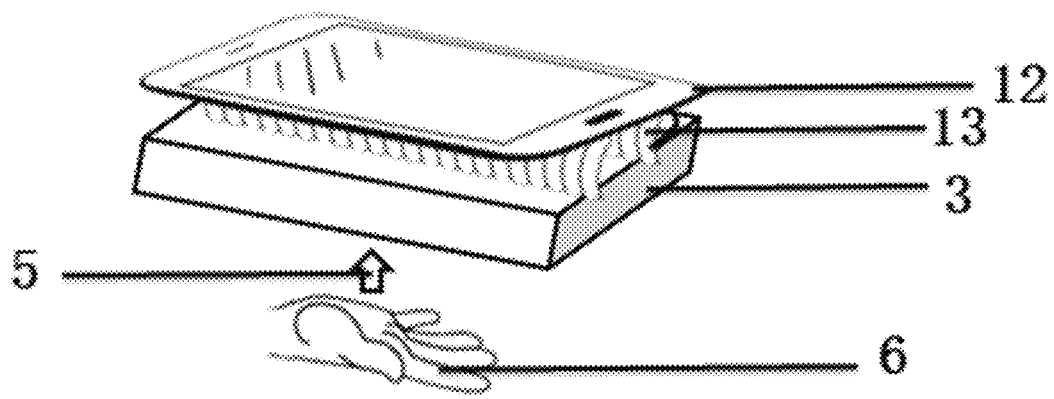
FIG. 6 is a schematic diagram of energy harvesting according to embodiment 4 of the present invention.

As shown in FIG. 6, a metal coil 13 is fixed on an action body, a mobile phone 12 that can be wirelessly recharged is connected with two ends of the metal coil 13 to create a loop, and the mobile phone can be recharged when a person applies a force to the action body. At this moment, the metal coil is used as the energy harvester, the mobile phone is used as the power consumer, and the electrical energy is transmitted out in a wired manner.

Embodiment 5

Figure 7:
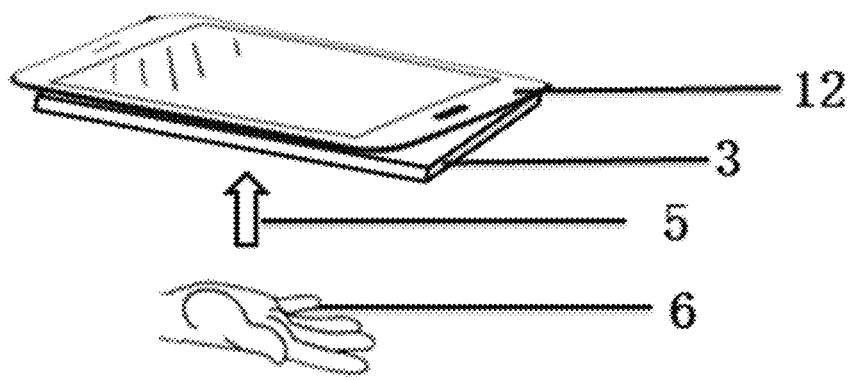
FIG. 7 is a schematic diagram of energy harvesting according to embodiment 5 of the present invention.

As shown in FIG. 7, a shell of a wirelessly-rechargeable mobile phone is made from a material capable of generating the electromagnetic field at the time of force application, and is slapped, tapped or rubbed by a hand for purposes of applying a force thereto, such that the wirelessly-rechargeable mobile phone 12 can be recharged. At this moment, the shell of the mobile phone is used as the power generating body, and the wirelessly-rechargeable mobile phone 12 is directly used as the energy harvester to harvest the energy of the electromagnetic field for its own use.

Embodiment 6

Figure 8:
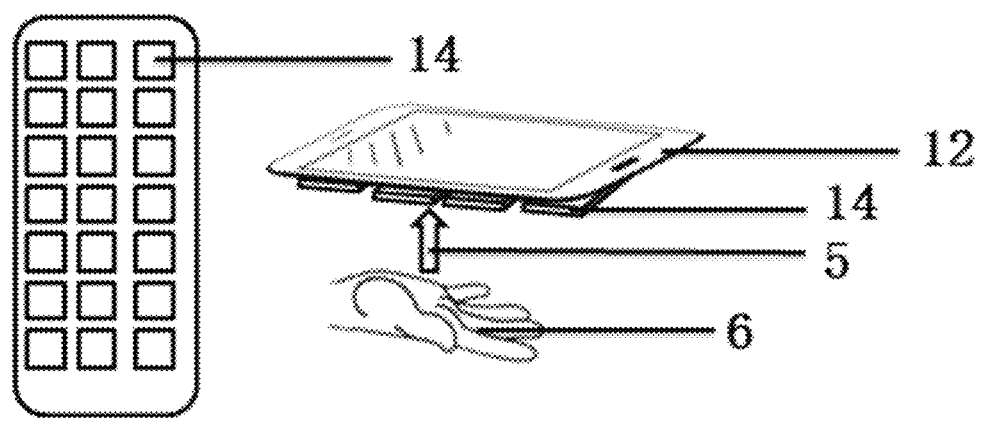
FIG. 8 is a schematic diagram of energy harvesting according to embodiment 6 of the present invention.

As shown in FIG. 8, the power generating bodies are distributed, in the form of an island-like array, on the backside of a shell of a wirelessly-rechargeable mobile phone. When the power generating bodies 14 distributed in an island-like form on the backside of the shell of the mobile phone are slapped, tapped or rubbed by a hand so as to apply a force to the power generating bodies, each of the small power generating bodies will generate the energy of the electromagnetic field, and the wirelessly-rechargeable mobile phone 12 thus can be recharged. At this moment, the mobile phone is directly used as the energy harvester to harvest the energy of the electromagnetic field for its own use. When used in combination with an irregularly-shaped energy harvester or an energy harvester having a complex shape or a power consumer used directly as the energy harvester, the power generating bodies can be distributed in an island-like form by use of this method, thereby improving the efficiency in harvesting and converting the energy of the electromagnetic field.

Embodiment 7

Figure 9:
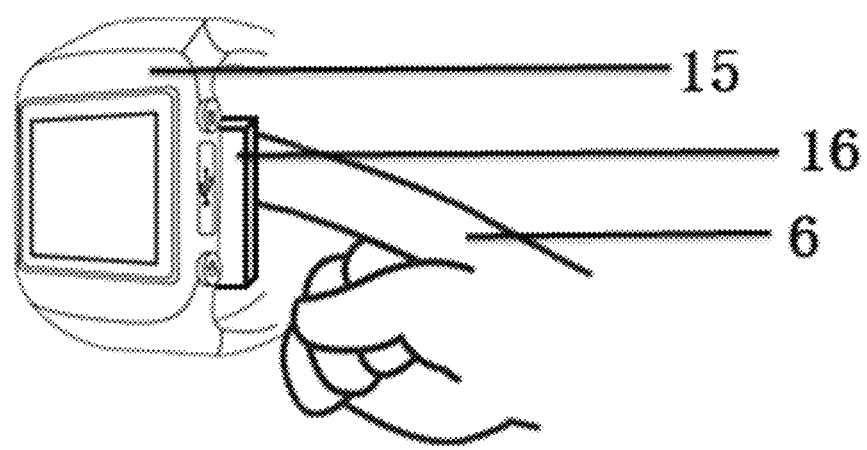
FIG. 9 is a schematic diagram of energy harvesting according to embodiment 7 of the present invention.

As shown in FIG. 9, a thin slab or film 16 made from some material is fixed at the bottom of a dial of a smart watch 15 and is rubbed or slapped by a human hand 6 in order to apply a force thereto, and in this way the smart watch can be recharged. At this moment, the thin slab or film is used as the power generating body, and the dial of the smart watch is directly used as the energy harvester to harvest and convert the energy of the electromagnetic field into electrical energy for its own use.

Embodiment 8

Figure 10:
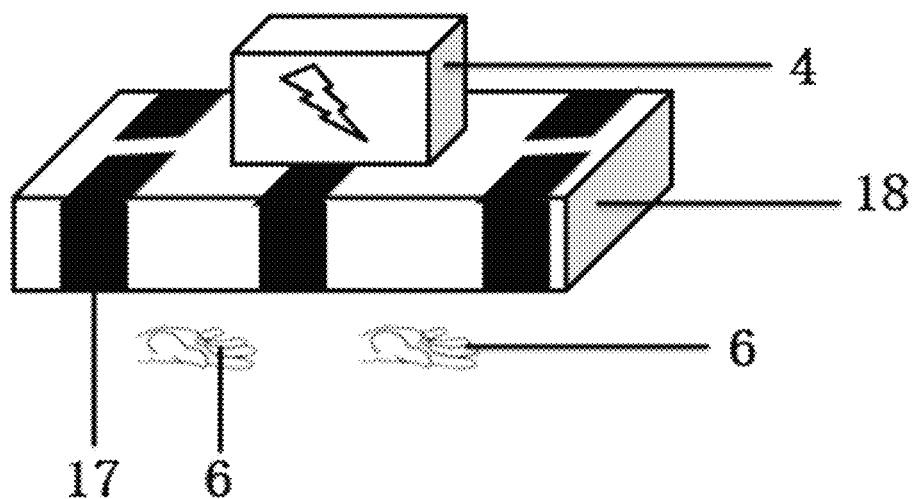
FIG. 10 is a schematic diagram of energy harvesting according to embodiment 8 of the present invention.

As shown in FIG. 10, an energy harvester 18 inlaid with power generating bodies is fixed on a power consumer, the energy harvester and the power generating bodies 17 inlaid in the energy harvester are meshed and fixed together, and a person applies a force to the power generating body such that the energy harvester harvests and converts the energy of the electromagnetic field into electrical energy for use by the power consumer.

Embodiment 9

Figure 11:
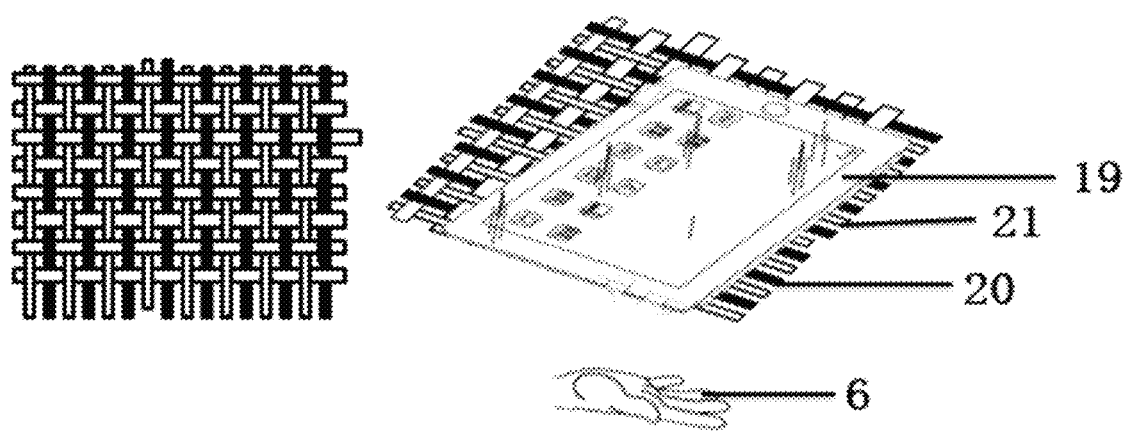
FIG. 11 is a schematic diagram of energy harvesting according to embodiment 9 of the present invention.

As shown in FIG. 11, a flexible fabric woven from an energy harvester and power generating bodies is fixed on the back of a tablet 19, a force is applied by a hand to the fabric such that the power generating bodies 20 in the fabric that are woven with the energy harvester take up this force, and meanwhile the energy harvester 21 in the fabric that is woven with the power generating bodies harvests the energy of the electromagnetic field generated by the power generating bodies, and the energy is transferred in a wireless manner to, and thus used by, the tablet.

The description above is the preferred implementation of the present invention. It shall be noted that for those ordinary skilled in the art, several improvements and modifications can also be made without departing from the principle of the present invention. These improvements and modifications shall also be regarded as the scope of protection of the present invention.

What is claimed is:

1. A self-generating power supply apparatus comprising:
power generating bodies;
energy harvesters; and
a power consumer,
wherein the power generating bodies generate an electromagnetic field when a force is applied to the power generating bodies, an energy of the electromagnetic field is harvested by the energy harvesters contacting or not contacting the power generating bodies, and the energy of the electromagnetic field is converted into electrical energy, and the electrical energy is transmitted by the energy harvesters to the power consumer in a wired manner or a wireless manner,
wherein the power generating bodies are strips of power generating bodies, the energy harvesters are strips of energy harvesters that are disposed parallel to the strips of power generating bodies, each of the strips of power generating bodies is disposed on top of additional strips and each of the strips of energy harvesters is disposed under said additional strips in an interwoven structure.

2. The self-generating power supply apparatus according to claim 1, wherein the energy of the electromagnetic field is directly harvested by the power consumer contacting or not contacting the power generating body in a wired transfer manner or a wireless transfer manner for a use by the power consumer.

3. The self-generating power supply apparatus according to claim 1, wherein the power generating body is made from at least one selected from the group consisting of organic material, inorganic material and composite material, the power generating body is of a one-dimensional structure, a two-dimensional structure or a three-dimensional structure, and the power generating body is of a rigid structure or a flexible structure.

4. The self-generating power supply apparatus according to claim 1, wherein the self-generating power supply apparatus is configured to be applied in environments comprising at least one of a liquid environment or a gaseous environment.

5. A method for self-generating power comprising:
generating an electromagnetic field by applying a force by hand to a power generating body, wherein the power generating body is composed of a material that is configured to generate the electromagnetic field in response to the force being applied to the material;
harvesting, by an energy harvester, energy of the electromagnetic field by the energy harvester contacting or not contacting the power generating body, wherein the energy harvester includes a coil that receives said electromagnetic field directly from the material on which said force is applied and the coil harvests the energy of the electromagnetic field;

converting, by the coil of the energy harvester, the energy of the electromagnetic field into electrical energy; and transmitting, by the energy harvester, the electrical energy to a power consumer in a wired manner or a wireless manner.

6. The method according to claim 5, wherein the force is applied by contacting, collision, slapping, tapping, stepping, squeezing, or rubbing.

7. The method according to claim 5, wherein the energy of the electromagnetic field is harvested by the energy harvester contacting or not contacting the power generating body, and the electrical energy is transferred to the power consumer in a wired transmission manner or a wireless transmission manner.

8. The method according to claim 5, wherein the energy harvester is made from at least one selected from the group consisting of organic material, inorganic material and composite material, the energy harvester is an article made from artificial materials or the energy harvester is a naturally occurring object; the energy harvester is of a one-dimensional structure, a two-dimensional structure or a three-dimensional structure, and the energy harvester is of a rigid structure or a flexible structure.

9. The method according to claim 5, wherein the power generating body, the energy harvester and the power consumer in the self-generating power supply apparatus are configured in a stacking structure, a meshing structure, an inlaid structure, an island distribution structure, or an array structure.

* * * * *